(12) United States Patent
Kim et al.

(10) Patent No.: US 8,512,162 B2
(45) Date of Patent: Aug. 20, 2013

(54) GOLF SIMULATION APPARATUS AND METHOD FOR THE SAME

(75) Inventors: Pil Joo Kim, Chuncheon-si (KR); Joo Myung Jeong, Seoul (KR); Jae Yoon Ok, Goyang-si (KR)

(73) Assignee: Golfzon Co., Ltd., Daejeon (KR)

( * ) Notice: Subject to any disclaimer, the term of this patent is extended or adjusted under 35 U.S.C. 154(b) by 0 days.

(21) Appl. No.: 13/376,666

(22) PCT Filed: Jun. 30, 2010

(86) PCT No.: PCT/KR2010/004247
§ 371 (c)(1),
(2), (4) Date: Dec. 7, 2011

(87) PCT Pub. No.: WO2011/002225
PCT Pub. Date: Jan. 6, 2011

(65) Prior Publication Data
US 2012/0083351 A1  Apr. 5, 2012

(30) Foreign Application Priority Data

Jun. 30, 2009 (KR) .................. 10-2009-0059230
Jun. 30, 2009 (KR) .................. 10-2009-0059231
Jun. 30, 2009 (KR) .................. 10-2009-0059232

(51) Int. Cl.
*A63B 69/36* (2006.01)
*A63B 57/00* (2006.01)

(52) U.S. Cl.
USPC ........................................ 473/221; 473/407

(58) Field of Classification Search
USPC ................ 473/131, 150–154, 199, 219–223, 473/266, 342, 409; 463/3, 7, 36–39; 434/252; 273/108.2; 702/41
See application file for complete search history.

(56) References Cited

U.S. PATENT DOCUMENTS

| | | | | |
|---|---|---|---|---|
| 4,150,825 A | * | 4/1979 | Wilson | 473/152 |
| 5,056,791 A | * | 10/1991 | Poillon et al. | 473/156 |
| 5,333,874 A | * | 8/1994 | Arnold et al. | 473/156 |
| 5,354,063 A | * | 10/1994 | Curchod | 473/156 |

(Continued)

FOREIGN PATENT DOCUMENTS

| | | |
|---|---|---|
| JP | 2005-510269 | 4/2005 |
| KR | 10-0788003 | 12/2007 |

OTHER PUBLICATIONS

Korean Intellectual Property Office, Written Opinion of the International Searching Authority for International Application No. PCT/KR2010/004247, Feb. 23, 2011.

(Continued)

*Primary Examiner* — Milap Shah
(74) *Attorney, Agent, or Firm* — Sherr & Jiang, PLLC (57) ABSTRACT

It is an object of the present invention to provide a golf simulation apparatus and a method for the same, which reproduce the trajectory of a golf ball hit by a golfer to give a sense of reality to the golfer by identifying a current golf club and applying information about the identified golf club in a simulation result, the object can be accomplished by the provision of a golf simulation apparatus for simulating a golf course, including a sensing unit for sensing at least one of a golf ball hit by a golfer and a golf club used by the golfer in a simulated golf course, a club identification unit for identifying the golf club used by the golfer in the simulated golf course, and a simulation unit for simulating.

14 Claims, 4 Drawing Sheets

(56) References Cited

U.S. PATENT DOCUMENTS

| | | | |
|---|---|---|---|
| 5,558,333 A * | 9/1996 | Kelson et al. | 473/131 |
| 5,846,136 A * | 12/1998 | Wu | 472/119 |
| 5,846,139 A | 12/1998 | Bair et al. | |
| 5,906,547 A * | 5/1999 | Tynan | 473/199 |
| 6,041,651 A * | 3/2000 | Naruo et al. | 73/491 |
| 6,565,448 B2 * | 5/2003 | Cameron et al. | 473/131 |
| 6,595,863 B2 * | 7/2003 | Chamberlain et al. | 473/132 |
| 7,041,014 B2 * | 5/2006 | Wright et al. | 473/409 |
| 7,489,241 B2 * | 2/2009 | Miettinen et al. | 340/572.1 |
| 7,892,114 B2 * | 2/2011 | Saegusa et al. | 473/409 |
| 2003/0109322 A1 * | 6/2003 | Funk et al. | 473/222 |
| 2003/0191547 A1 * | 10/2003 | Morse | 700/91 |
| 2004/0198524 A1 | 10/2004 | Kwon | |
| 2005/0272516 A1 * | 12/2005 | Gobush | 473/200 |
| 2007/0196800 A1 * | 8/2007 | Douthit et al. | 434/252 |
| 2008/0085778 A1 * | 4/2008 | Dugan | 473/223 |
| 2009/0017944 A1 * | 1/2009 | Savarese et al. | 473/407 |
| 2009/0069105 A1 * | 3/2009 | Holland | 473/199 |
| 2009/0131193 A1 * | 5/2009 | Swartz et al. | 473/289 |
| 2009/0191929 A1 * | 7/2009 | Nicora | 463/3 |
| 2009/0326688 A1 * | 12/2009 | Thomas et al. | 700/91 |
| 2010/0062869 A1 | 3/2010 | Chung et al. | |
| 2011/0250939 A1 * | 10/2011 | Hobler | 463/7 |

OTHER PUBLICATIONS

Korean Intellectual Property Office, International Search Report for International Application No. PCT/KR2010/004247, Feb. 23, 2011.

* cited by examiner

GOLF SIMULATION APPARATUS AND METHOD FOR THE SAME

CROSS REFERENCE TO PRIOR APPLICATIONS

The present application is a National Stage Application of PCT International Application No. PCT/KR2010/00004247 (filed on Jun. 30, 2010), under 35 U.S.C. 371, which claims priority to Korean Patent Application Nos. 10-2009-0059230 (filed on Jun. 30, 2009), 10-2009-0059231 (filed on Jun. 30, 2009), and 10-2009-0059232 (filed on Jun. 30, 2009), which are all hereby incorporated by reference in their entirety.

TECHNICAL FIELD

The present invention relates to a golf simulation apparatus, and more particularly, to a golf simulation apparatus for simulating various real golf courses by use of a display and sensors, sensing the trajectory of a ball hit by a golfer, and displaying the sensed trajectory graphically on the display.

BACKGROUND ART

In general, golf clubs differ in material, length, head shape, head material, head weight, and head loft (the vertical tilting angle of the face surface of a club head). A golfer selects an appropriate golf club from among a variety of golf clubs according to the topology of a golf course or a distance to be shot and hits a ball by the selected golf club.

Although each golf club has different characteristics in terms of distance and the spin of a ball after the ball is hit, a conventional golf simulation apparatus estimates the shot based on uniform data and rules without applying the characteristics of a golf club that a golfer is now using in the sensed result, thus not so effective in offering an accurate and fine simulation.

In addition, golf clubs have different characteristics depending on their manufacturers and golfers differ in their physical traits. Therefore, it is difficult for a golfer to determine an appropriate golf club for himself or herself based on a uniform criterion and thus the golfer cannot obtain information about a golf club suitable for the golfer through golf simulation.

A golf simulation apparatus is based on virtual reality. This means that the golf simulation apparatus gives a sense of reality to a golfer as if he were playing golf in a real golf course through visualization of an almost real golf course.

In view of the nature of the virtual reality-based golf simulation apparatus, the effect of advertisement may be enhanced by displaying a graphical advertisement of golf products or golf product manufacturers and thus providing advertisement information to a golfer enjoying golf simulation.

However, an advertisement on the screen of golf simulation may disturb a virtual golf rounding of the golfer. Moreover, an unnatural pop-up of an advertisement may feel annoying to the golfer.

Accordingly, there exists a need for developing a new golf simulation apparatus and method that can make an effective advertisement by displaying advertisement information during a golf simulation in a natural manner that causes no uncomfortable feeling to a golfer.

DISCLOSURE OF INVENTION

Technical Problem

Therefore, the present invention has been made in view of the above problems, and it is an object of the present invention to provide a golf simulation apparatus and a method for the same, which reproduce the trajectory of a golf ball hit by a golfer to give a sense of reality to the golfer by identifying a current golf club and applying information about the identified golf club in a simulation result in a simulated virtual golf course, which help the golfer to make a right decision by providing accurate and detailed statistic data about the current golf club to the golfer so that the golfer is aware of the characteristics of the current golf club, and which make an effective advertisement by providing advertisement information to the golfer in a natural manner, while identifying the current golf club during the golf simulation, and thus attracting the golfer's interest to the advertisement information.

Solution to Problem

In accordance with an aspect of the present invention, the above and other objects can be accomplished by the provision of a golf simulation apparatus for simulating a golf course, including a sensing unit for sensing at least one of a golf ball hit by a golfer and a golf club used by the golfer in a simulated golf course, a club identification unit for identifying the golf club used by the golfer in the simulated golf course, and a simulation unit for simulating a trajectory of the golf ball in the simulated golf course according to information about the golf club identified by the club identification unit and a result sensed by the sensing unit.

The club identification unit may include a club data storage attached to the golf club used by the golfer, for storing data about the golf club, and a receiver connected wirelessly to the club data storage, for receiving the data about the golf club from the club data storage.

The club identification unit may include an indicator attached to the golf club used by the golfer, for identification of the golf club, and a club identifier for capturing an image of the indicator and identifying the golf club based on the captured image.

The golf simulation apparatus may further include a database for accumulating information about the golf club identified by the club identification unit and rounding information based on the trajectory of the golf ball calculated by the simulation unit during the simulation. The simulation unit may include a statistics processing means for calculating characteristics of the golfer, for each club by matching the simulated trajectory of the golf ball with the information about the identified golf club.

In accordance with another aspect of the present invention, there is provided a golf simulation apparatus for simulating a rounding in a golf course, including a club identification unit for identifying a golf club used by a golfer in a simulated golf course, a database for storing data required for simulating a rounding in a golf course and storing contents data including video or audio information about advertisements or contents related to each golf club, an Audio/Video (A/V) processing unit for processing audio and video information required for simulating the rounding in the golf course, and a controller for extracting contents data corresponding to the golf club identified by the club identification unit from the database and controlling the A/V processing unit to process the extracted contents data.

The controller may control the contents data about the identified golf club to be output along with a simulated image of the rounding in the golf course.

The club identification unit may determine whether the identified golf club is authentic, and the controller may control contents data corresponding to an advertisement or contents related to the golf club to be extracted from the database and output, according to whether the club identification unit determines the golf club as authentic or not.

In accordance with another aspect of the present invention, there is provided a golf simulation apparatus for simulating a rounding in a golf course, including a club identification unit including a club data storage attached to a golf club used by a golfer and a receiver wirelessly connected to the club data storage, the club data storage being used for storing contents data including data about the golf club and video or audio information about advertisements or contents related to the golf club, and the receiver being used for receiving data from the club data storage, an A/V processing unit for processing audio and video information required for simulating the rounding in the golf course, and a controller for receiving identification information about the golf club and the contents data about the identified golf club and controlling the A/V processing unit to process the received identification information and contents data.

In accordance with a further aspect of the present invention, there is provided a golf simulation method for simulating a rounding in a golf course, including identifying a golf club used by a golfer, for a golf simulation, sensing at least one of the identified golf club and a golf ball hit by the identified golf club, calculating a trajectory of the golf ball to be simulated according to data about a type and specification of the identified golf club and sensed data; and displaying the calculated trajectory of the golf ball on the golf course.

Advantageous Effects of Invention

According to the golf simulation apparatus and method according to the present invention, a golf club that a golfer is using in a simulated virtual golf course is identified and information about the identified golf club is applied in a simulated result. Therefore, the trajectory of a golf ball hit by the golfer is more accurately reproduced, giving a sense of reality to the golfer. In addition, accurate and detailed statistic data about the golf club is provided to the golfer so that the golfer is aware of the characteristics of the golf club, which helps the golfer to make a right decision in relation to a golf game that he is now playing. Further, while the golf club is being identified during the golf simulation, advertisement information is provided to the golfer in a natural manner and the golfer is let to determine whether his golf club is authentic. Accordingly, the advertisement effect is enhanced and service reliability is increased.

BRIEF DESCRIPTION OF DRAWINGS

The above and other objects, characteristics and other advantages of the present invention will be more clearly understood from the following detailed description taken in conjunction with the accompanying drawings, in which.

BEST MODE FOR CARRYING OUT THE INVENTION

The matters defined in the description such as a detailed construction and specific elements, are provided to assist in a comprehensive understanding of the embodiments of the invention. Accordingly, those of ordinary skill in the art will recognize that various changes and modifications of the embodiments described herein can be made without departing from the scope and spirit of the present invention.

A golf simulation apparatus and a method for the same according to exemplary embodiments of the present invention will be described below in detail.

Figure 1:
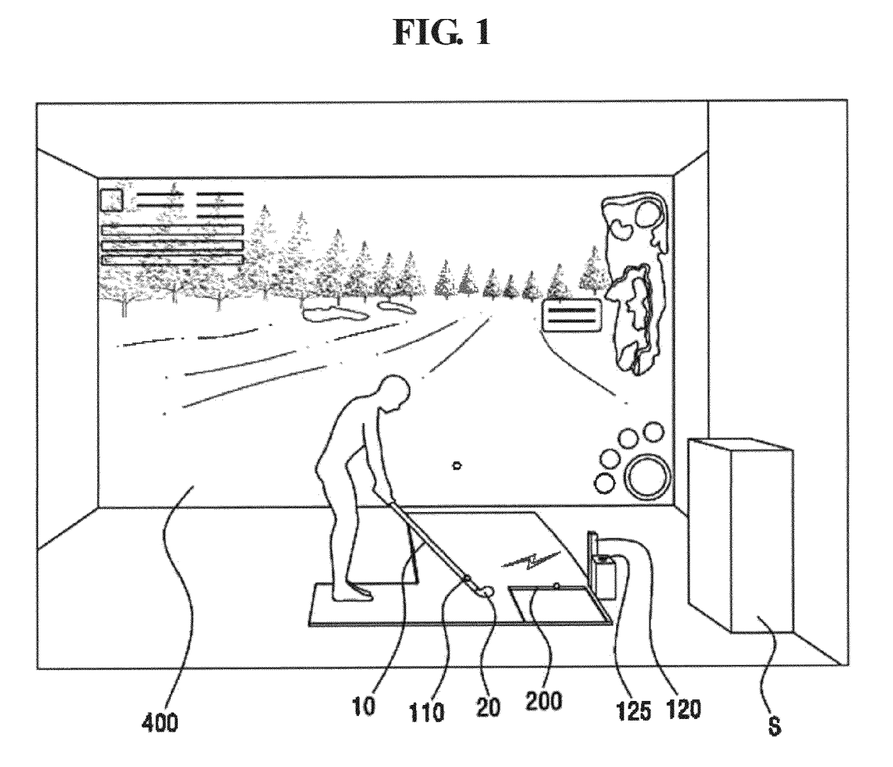
FIG. 1 is a case to which a golf simulation apparatus according to an exemplary embodiment of the present invention is applied.
Figure 2:
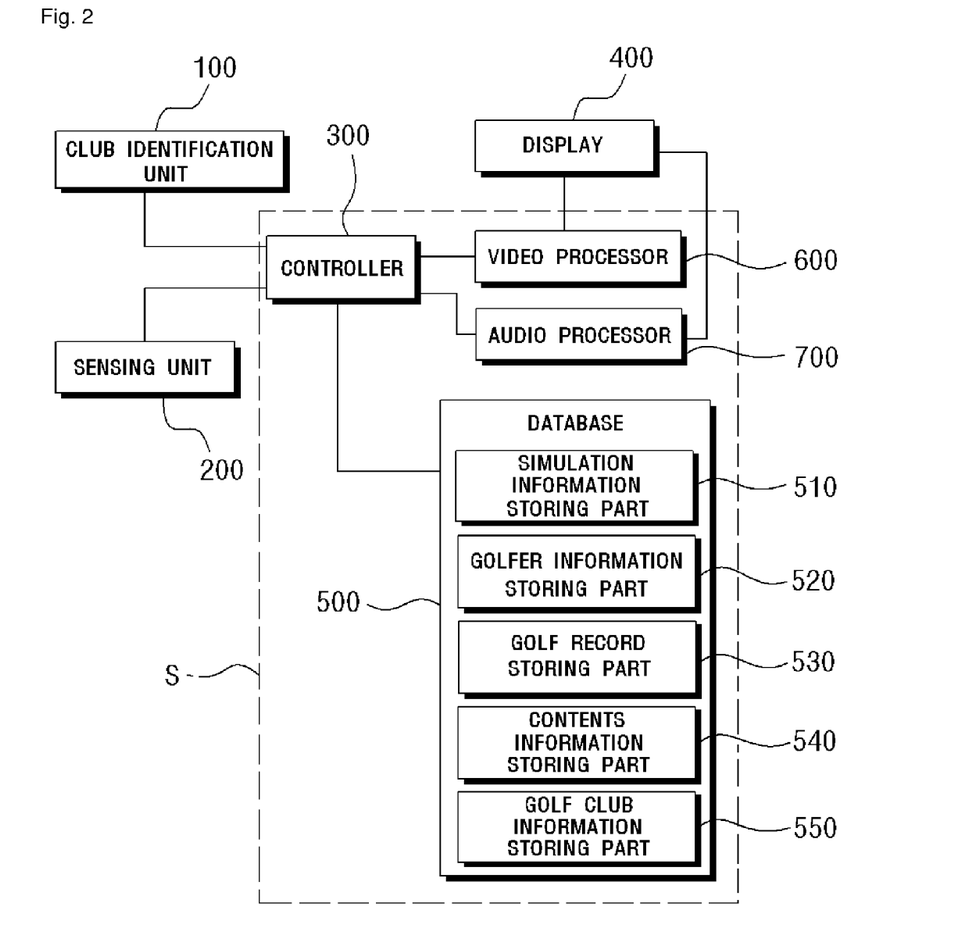
FIG. 2 is a schematic block diagram of the golf simulation apparatus illustrated in FIG. 1.

FIG. 1 is a case to which a golf simulation apparatus according to an exemplary embodiment of the present invention is applied and FIG. 2 is a schematic block diagram of the golf simulation apparatus illustrated in FIG. 1.

Referring to FIGS. 1 and 2, the golf simulation apparatus according to an exemplary embodiment of the present invention includes a simulation unit S, a sensing unit 200, and a club identification unit 100 (110 and 120 in FIG. 1).

The simulation unit S may include an Audio/Video (A/V) processing unit 600 and 700, a DataBase (DB) 500, and a controller 300.

The A/V processing unit 600 and 700 includes a video processor 600 for extracting data about a golf course for use in golf simulation or data about an interface for use in selections involved in golf rounding from the DB 500, visually processing the extracted data, and outputting the processed data to a display 400, and an audio processor 700 for processing audio data for golf courses and outputting the processed audio data. While the video processor 600 and the audio processor 700 may be configured as separate devices or modules, they may be incorporated into a single device or module.

The DB 500 stores all data required for golf simulation. The DB 500 may include a simulation information storing part 510, a golfer information storing part 520, a golf record storing part 530, a contents informationinformation storing part 540, and a golf club information storing part 550.

The simulation information storing part 510, the golfer information storing part 520, the golf record storing part 530, the contents informationinformation storing part 540, and the golf club information storing part 550 may be configured as independent storage devices or may be realized in a partial physical area of a single storage device.

The simulation information storing part 510 stores all data required for golf simulation. For example, it stores data about images of golf courses, background images, and data about sound effects for the golf courses.

The golfer information storing part 520 stores personal information about golfers registered as members to the system.

The golf record storing part 530 stores golf records such as the number of shots and a distance in each hole for golfers that have played golf by the golf simulation apparatus.

The golf record storing part 530 may classify the golf records by golfer or by any other classification condition. For instance, golfers are ranked according to their skill and the golf recording storage 530 stores the golf records by rank.

The contentsinformation storing part 540 stores contents data including audio and/or video information about advertisements or contents related to golf clubs. Preferably, the contentsinformation storing part 540 stores all of advertisement contents for golf clubs identified by the club identification unit 100 and contents data related to golf clubs.

For instance, contents data such as the manufacturer of a particular golf club identified by the club identification unit 100, the brand and logo of the golf club, and advertisements for golf products related to the golf club are stored in the contentsinformation storing part 540. Upon request of the controller 300 (when the golf club is identified by the club identification unit 100), data related to the golf club is processed in the A/V processing unit 600 and 700 and then displayed on the display 400.

The golf club information storing part 550 stores data about the characteristics of golf clubs and their specifications by type. Information about the type and specification of a particular golf club identified by the club identification unit 100 is extracted from the golf club information storing part 550 and applied in golf simulation.

The controller 300 calculates physical quantities such as the trajectory and spin of a golf ball hit by the golfer based on club identification information received from the club identification unit 100 and sensed data about the golf ball and/or a golf club used by the golfer, received from the sensing unit 200, provides the calculated physical quantities to the A/V processing unit 600 and 700, and controls the A/V processing unit 600 and 700 to process video and audio information of a simulated image of the trajectory of the golf ball. Also, the controller 300 extracts necessary data from the DB 500 and controls the A/V processing unit 600 and 700 to visually or audibly process the extracted data.

The A/V processing unit 600 and 700 processes video and audio information about simulations, video and audio information about advertisement contents, and other golf simulation-related video and audio information and displays the processed information on the display 400.

The sensing unit 200 generates data required to calculate a number of parameters for use in calculating the trajectory of the golf ball hit by the golfer by sensing the shot. In addition, the sensing unit 200 generates data required to calculate a number of parameters for use in calculating the swing trajectory of the golf club by sensing the swing of the golf club that has hit the golf ball.

The sensing unit 200 may be configured to include an InfraRed (IR) light receiving and emitting sensor, which should not be construed as limiting the scope and spirit of the present invention. The sensing unit 200 may also be configured to include an image sensor for acquiring an image about a golf ball and a golf club and analyzing the image. Any other type of sensor is available for the sensing unit 200.

The club identification unit 100 identifies a golf club that a golfer swings during golf rounding by golf simulation. For example, the club identification unit 100 may include a club data storage 110 attached to a golf club, for storing data about the specification of the golf club and a receiver 120 wirelessly connected to the club data storage 110, for receiving the data about the golf club from the club data storage 110.

Preferably, the club data storage 110 stores data about the type and specification of a golf club. As far as its capacity permits, the club data storage 110 may further store other information.

The receiver 120 receives the data about the golf club from the club data storage 110 wirelessly and outputs the received data to the controller 300.

Although any device will do as the club data storage 110 and the receiver 120 as far as it can transmit and receive data wirelessly, a uni-directional wireless communication scheme is preferred to an expensive bi-directional wireless communication scheme for the club data storage 110 and the receiver 120.

For instance, the club identification unit 100 may operate in a uni-directional wireless communication scheme such as Radio frequency (RF) or IR communication or in a bidirectional wireless communication scheme based on short-range wireless communication such as Bluetooth or Zigbee.

In the golf simulation apparatus according to the exemplary embodiment of the present invention, the club identification unit 100 includes the club data storage 110 configured as a Radio Frequency Identification (RFID) tag, and the receiver 120 configured as an RFID reader for receiving information stored in the RFID tag. RFID is a technology of remotely identifying data by signal waves. RFID tags are classified as passive or active.

Active RFID tags include a battery. Thus the active RFID tags are capable of high-speed communication and have a large storing capacity, although they are expensive. Passive RFID tags receive transmission power from a reader. Although the passive RFID tags communicate at low rates and have a small storing capacity, they can be made small and they are cheap.

Considering that the club data storage 110 does not store much data including specification data about a golf club and does not need high-speed communication either, a passive RFID tag is preferable for the club data storage 110. A passive RFID tag is also preferable owing to its small size because each club should be attached with the club data storage 110.

As the club data storage 110 being an RFID tag is nearer to the receiver 120, it is better. The distance between the club data storage 110 and the receiver 120 and interference with club swings may be minimized by attaching the RFID tag at the joint between a club header 20 and a shaft 10 as illustrated in FIG. 1.

Besides an RFID tag and an RFID reader, a golf club may be identified based on a new short-range wireless communication standard, RuBee (Institute of Electrical and Electronics Engineers (IEEE) 1902.1) in accordance with the present invention. Thus, the club data storage 110 and the receiver 120 may be configured as a RuBee tag and a RuBee reader, respectively. RuBee offers the benefits of normal operation near to any object and thus reliable communication, a relatively long communication distance, and cheap products.

Compared to RFID, RuBee uses a signal in a magnetic field. Even a RuBee device is wrapped in aluminum foil, it is capable of normal communication. Thus, a RuBee device can be implanted inside a golf club during fabrication of the golf club.

If the club identification unit 100 is configured to include the club data storage 110 being an RFID or RuBee tag and the receiver 120 being an RFID or RuBee reader as stated before, the golf club information storing part 550 may not be needed because specification data about golf clubs are stored in the club data storage 110.

That is, as data about the type and specification of a golf club can be received directly from the club data storage 110 being an RFID or RuBee tag, there is no need for storing data about the golf club separately in the DB 500.

When the club data storage 110 further stores advertisements or contents data related to the golf club, the DB 500 may not need to include the contents informationinformation storing part 540.

In this case, since contents data such as advertisements related to the golf club or contents related to the golf club (e.g. a grip required for the golf club, a detailed description of resources of the golf club, and a description of a golf club made by an actual golf professional) are already stored in the club data storage 110, the contents data may be received directly from the club data storage 110.

Figure 3:
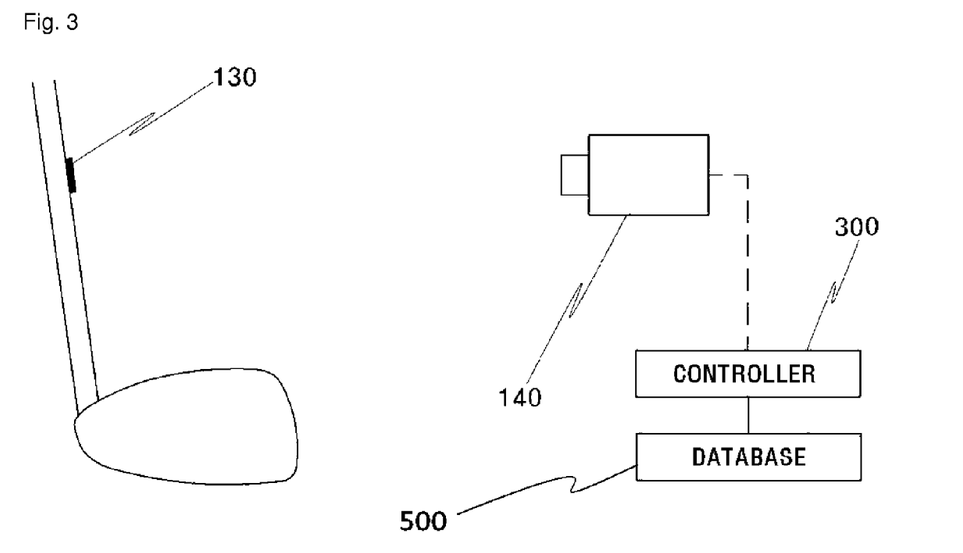
FIG. 3 illustrates a club identification method in a golf simulation apparatus according to another exemplary embodiment of the present invention.

It may be further contemplated as another exemplary embodiment of the present invention that the club identification unit 100 includes an indicator 130 attached to a golf club, a club identifier 140 for identifying the golf club by reading the indicator 130.

The indicator 130 may be configured to be identifiable using a simple figure, a reflective index, or a color, and the club identifier 140 identifies a golf club by reading the indicator 130 using an image identification device such as a camera.

In the club identification unit 100, the indicator 130 is configured only to enable identification of a golf club, rather than it includes data about the golf club. The club identifier 140 identifies the golf club from the indicator 130 and then reads information about the identified golf club from the golf club information storing part 550 of the DB 500 in this exemplary embodiment of the present invention.

With the golf club identification method of the club identification unit 100 including the indicator 130 and the club identifier 140, contents data is not achieved from the indicator 130. Thus contents data about the golf club identified from the indicator 130 is extracted from the contentsinformation storing part 540 of the DB 500.

In accordance with this exemplary embodiment, the club identification unit 100 may identify a golf club very simply. A golfer has only to attach the indicator 130 or a simple indication to his or her golf club. Therefore, the indicator 130 is very cheap to fabricate and causes no interference with the golfer during golf rounding.

As described above, the present invention is advantageous in that the trajectory of a golf ball hit by a golfer is accurately tracked because a golf club used by the golfer is identified using the club identification unit 100 and information about the type and specification of the identified golf club is used for calculating parameters required for golf simulation.

In addition, the present invention realizes an enhanced spin by estimating a spin of the golf ball to be simulated using the information about the type and specification of the identified golf club.

Specifically, a shot has a different spin type, spin strength and spin direction depending on the types of golf clubs and depending on the manufacturers of the golf clubs if the golf clubs are of the same type. As the unique spin characteristics of each golf club are applied in a simulation result, the simulation result is more accurate.

Figure 4:
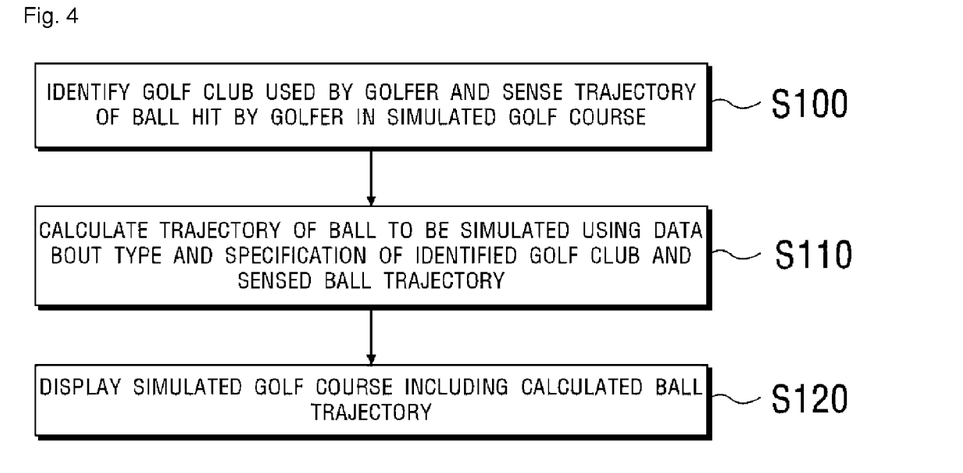
FIG. 4 is a flowchart illustrating a golf simulation method according to an exemplary embodiment of the present invention.

FIG. 4 is a flowchart illustrating a golf simulation method in the golf simulation apparatus according to an exemplary embodiment of the present invention. The same description as made of the golf simulation apparatus will not be provided herein to avoid redundancy.

Referring to FIG. 4, when a golfer stands on a tee line mat and hits a ball by swinging a golf club, the club identification unit 100 identifies the golf club and the sensing unit 200 senses the trajectories of the ball and the golf club in a simulated golf course in step S100. The controller 300 calculates a trajectory of the ball to be simulated, based on information about the type and specification of the golf club identified by the club identification unit 100 and the trajectories of the ball and the golf club sensed by the sensing unit 200 in step S110. A golf course including the calculated trajectory of the ball is displayed on the display 400.

Meanwhile, the simulation unit S in the golf simulation apparatus according to another exemplary embodiment of the present invention may include a statistics processing means for calculating the characteristics of each golfer according to golf clubs by matching simulated trajectories of balls with information about golf clubs identified by the club identification unit 100.

The statistics processing means may be implemented into a separate module or device for receiving simulation information, record information, and information about a golf club identified by the club identification unit 100 from the controller 300 and calculating statistical information for each golf club. Or the controller 300 may be configured so as to perform the statistics processing function according to a program that executes the process.

The statistics processing means extracts a golfer's characteristics for each golf club by matching simulation-based golf rounding information calculated by the controller 300 with data about a golf club identified by the club identification unit 100 and accumulates the extracted characteristics of each golf club in the DB 500 for each golfer.

The statistics processing means analyzes the accumulated statistical data and provides the analysis result through the display 400 or a network. The analysis result may be provided visually using graphs, for example.

The statistics processing means may also analyze the accumulated information, rank golfers according to their skill (e.g. high, medium, and amateur using various information such as their average number of shots, their use or non-use of a mulligan, etc.) based on the analysis, and calculate statistical data for the classification. This statistical data may be utilized variously. For example, clubs selected by other golfers with a similar skill are analyzed and an appropriate golf club is recommended accordingly for a golfer.

In addition, the statistics processing means may calculate statistical information for each golfer, such as average scoring, average distance, driving accuracy percentage, Green in Regulation (GIR), average putting, sand save percentage, and par save percentage.

Besides the above statistics, for example, information about the distance of 1-wood, whether a ball slices or hooks with 1-wood, the distance of each iron, and a golf club that other golfers having a similar skill usually use may be useful on the part of a golfer. The golf simulation apparatus and method according to the present invention can provide such detailed statistics to a golfer.

Hence, the golfer may self-diagnose his swing based on information about the characteristics of each golf club (for example, a ball slices or hooks with 1-wood) and determine whether his golf club is suitable for him, referring to clubs selected by other golfers having a similar or higher skill than him in the golf simulation apparatus of the present invention.

Furthermore, the golfer may accurately self-diagnose his skill more simply and more efficiently using information about each golf club than in a real golf field.

The characteristics of golfers may be classified more accurately based on the above detailed statistics and a customized lesson may be given to a golfer according to the characteristics of the golfer.

Figure 5:
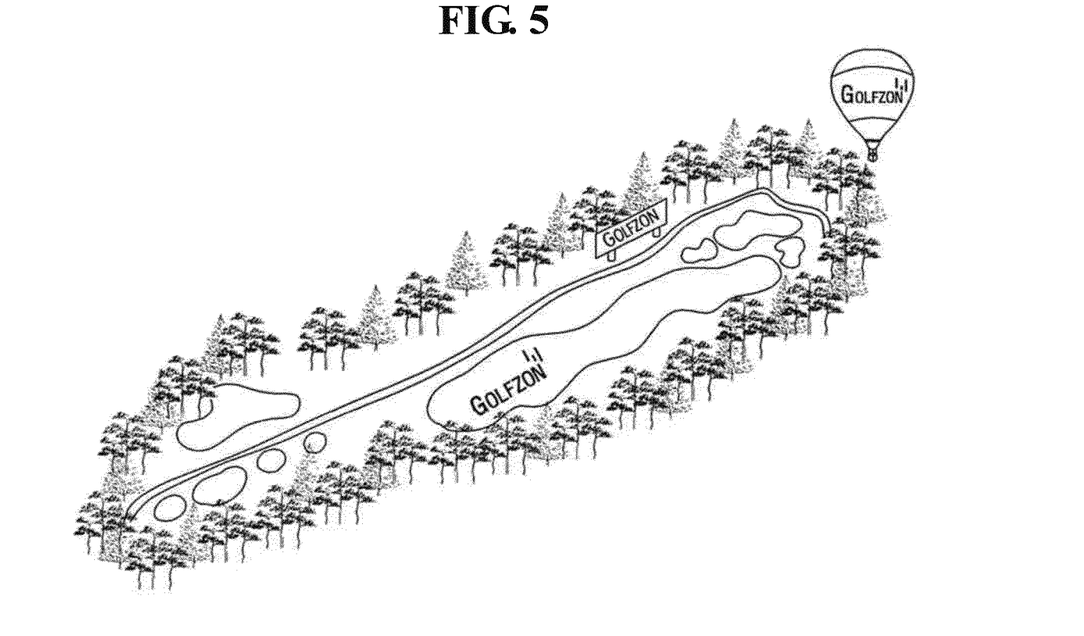
FIG. 5 illustrates an example of an advertisement content displayed in a golf simulation apparatus according to a further exemplary embodiment of the present invention.
Figure 6:
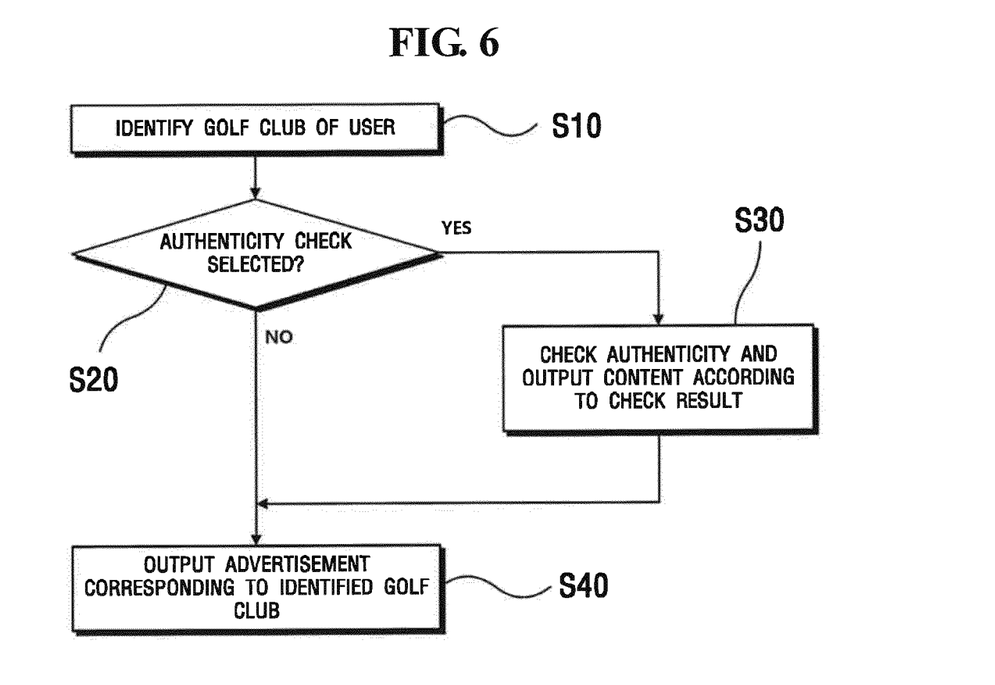
FIG. 6 is a flowchart illustrating a golf simulation method according to another exemplary embodiment of the present invention.

With reference to FIGS. 5 and 6, a detailed description will be made of contents data provision and product authentication features of the golf simulation apparatus and method according to the present invention.

Contents data may be stored in the club data storage 110 attached to a golf club, or in the contentsinformation storing part 540 of the DB 500 in the simulation unit S (refer to FIGS. 1 and 2).

Contents corresponding to the contents data may be advertisement contents of the manufacturer of an identified golf club or useful information about the golf club to a golfer (e.g. how to use the golf club rightly, a lesson related to the golf club, etc.).

FIG. 5 illustrates an example of outputting a simulated image along with contents data including an advertisement or contents related to a golf club identified by the club identification unit in the golf simulation apparatus according to an exemplary embodiment of the present invention.

The advertisement or contents related to the golf club may be displayed on a simulated golf course as illustrated in FIG. 5. Preferably, the advertisement or contents are displayed transparently enough not to disturb golf rounding of the golfer. Also, the advertisement or contents may be displayed matched to a predetermined object such as an ad-balloon near to the simulated golf course.

If the golfer's rounding is likely to be disturbed by displaying the contents, the contents may be displayed during a time interval between holes, after rounding, or before rounding.

Meanwhile, while a golf club is being identified, an encrypted authenticity code stored in the club data storage 110 (refer to FIG. 1) attached to the golf club is read by the receiver 120 of FIG. 1 and it is determined whether the golf club is authentic based on the read authenticity code.

FIG. 6 is a flowchart illustrating a golf simulation method involving a contents-related step and an authenticity-related step according to another exemplary embodiment of the present invention.

Referring to FIG. 6, when a golfer stands on a tee line mat or the golfer is positioned to allow a golf club to be identified by the club identification unit, the golf club of the golfer is identified in step S10.

When the golf club is identified, an authenticity determination step may be performed upon golfer selection. This step may be optional and thus triggered upon request of the golfer, or the authentication determination step may be performed independently.

Once a golfer purchases a golf club, he or she uses it for a long term. Therefore, there is no need for checking the authenticity of the golf club in each rounding on the part of the golfer.

In accordance with this exemplary embodiment of the present invention, the golfer is prompted to select whether to check the authenticity of the golf club in step S20. When the golfer selects to check the authenticity of the golf club, information about the golf club is read and its authenticity is checked. Then a content corresponding to the check result is output to the golfer in step S30.

If the authenticity of the golf club has already been checked or if the golfer selects not to check the authenticity of the golf club, an advertisement content related to the identified golf club is output along with a simulated golf course, after, before, or in the middle of rounding in step S40.

MODE FOR THE INVENTION

Various embodiments have been described in the best mode for carrying out the invention.

INDUSTRIAL APPLICABILITY

The golf simulation apparatus and the method for the same according to the present invention can enhance the virtual reality-based golf technology by providing a sense of reality to a virtual reality-based virtual golf game as if a golfer were playing golf in a real golf course, reproducing the trajectory of the golfer's shot more accurately, and providing the golfer with the golfer-intended statistical information and advertisement contents by golf simulation. Therefore, the present invention is widely applicable to a golf-related industry or a golf simulation-related industry based on sensing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A golf simulation apparatus for simulating a golf course, comprising:
    a sensing unit configured to sense a golfer's shot including at least one of a golf ball hit by a golfer and a golf club used by the golfer in a simulated golf course;
    a club identification unit configured to identify the golf club used by the golfer by obtaining club data from a club data storage attached to the golf club; and
    a simulation unit configured to execute a simulation to simulate a trajectory of the golf ball in the simulated golf course based on the golfer's shot according to data about parameters which are required for simulating the trajectory of the golf ball and calculated based on (i) the sensing of at least one of the golf ball hit by the golfer and the golf club used by the golfer and (ii) the club data obtained from the club storage attached to the golf club,
    wherein the simulation unit includes:
    a database configured to store (i) data required for simulating a round in the golf course, (ii) the club data for the identified golf club obtained from the club data storage, and (iii) data about a result of the simulation simulated by the simulation unit based on the club data of the identified golf club;
    an A/V processing unit for processing audio and video information required for simulating the round in the golf course; and
    a statistics processing means for (i) matching the result of the simulation with the club data of the identified golf club, (ii) calculating characteristics of the golfer's shot with the identified golf club based on the matching result, wherein the calculated characteristics information is accumulatively stored in the database, (iii) statistically analyzing the accumulatively stored characteristics information, and (iv) displaying the result of the statistical analysis through the A/V processing unit, wherein the accumulatively stored calculated characteristics include calculated characteristics of at least one additional simulation of another golf shot performed by the golfer using a different golf club having different club data than the identified golf club.

2. The golf simulation apparatus according to claim 1, wherein a receiver is connected wirelessly to the club data storage, the receiver configured to receive the club data about the golf club.

3. The golf simulation apparatus according to claim 2, wherein the club data storage is one of an RFID tag and a RuBee tag, and the receiver is one of an RFID reader and a RuBee reader, configured to wirelessly receive information stored in the RFID tag or the RuBee tag.

4. The golf simulation apparatus according to claim 2, wherein the club data storage wirelessly communicates with the receiver according to an uni-directional communication scheme being one of Radio Frequency (RF) communication and InfraRed (IR) communication, or according to a bi-directional communication scheme being one of Bluetooth and Zigbee.

5. The golf simulation apparatus according to claim 2, wherein the receiver further includes an indication part which visually indicates completion of reading the club data of the golf club from the club data storage.

6. The golf simulation apparatus according to claim 1, wherein the club data includes data about a type and specification of the golf club.

7. The golf simulation apparatus according to claim 1, wherein the statistics processing means is configured to analyze the accumulatively stored calculated characteristics from golf simulations for multiple identified golf clubs and provide a recommendation of a golf club to the golfer based on the analysis.

8. The golf simulation apparatus according to claim 1, wherein club data storage, which is attached to the golf club, is also configured to store contents data including video or audio information about advertisements or contents related to the golf club, and wherein the simulation unit is configured to receive the club data and the contents data from the club identification unit, and control the A/V processing unit to process the received club data and contents data.

9. The golf simulation apparatus according to claim 8, wherein the A/V processing unit is configured to process the contents data to be displayed on the simulated golf course.

10. The golf simulation apparatus according to claim 1, wherein the club data storage, which is attached to the golf club, is also configured to store data of an encrypted authenticity code used to determine whether the golf club is authentic, and wherein the identification unit is configured to wirelessly connect to the club data storage to receive the club data and encrypted authenticity code to determine whether the golf club is authentic based on the received data for the encrypted authenticity code.

11. A golf simulation method for simulating a round in a golf course, comprising:
    identifying a golf club used by a golfer by obtaining a club data of golf club from a club data storage attached to the golf club;
    sensing the golfer's shot including at least one of the identified golf club and a golf ball hit by the identified golf club;
    calculating parameters required for executing a simulation to simulate a trajectory of the golf ball to be simulated in the golf course based on the golfer's shot according to data about parameters which are required for simulating the trajectory of the golf ball and calculated based on the sensed golfer's shot and the club data of the identified golf club;
    calculating the trajectory of the golf ball to be simulated according to information about the calculated parameters; and
    displaying the simulation including the calculated trajectory of the golf ball in the golf course through an A/V processing unit which processes audio and video information required for simulating the round in the golf course, wherein the golf simulation method further comprising:
    matching a result of the simulation based on the calculated parameters with the club data of the identified golf club;
    calculating characteristics of the golfer's shot with the identified golf club based on the matching result, wherein the calculated characteristics information is accumulatively stored in a database;
    statistically analyzing the accumulated stored characteristics information; and
    displaying a result of the statistical analysis through the A/V processing unit, wherein the accumulatively stored calculated characteristics include calculated characteristics of at least one additional simulation of another golf shot performed by the golfer using a different golf club having different club data than the identified golf club.

12. The golf simulation method according to claim 11, further comprising:
    accumulating information for the analyzed statistical data for multiple identified golf clubs; and
    calculating records for each identified golf club used by the golfer based on the accumulated information and displaying the calculated records.

13. The golf simulation method according to claim 11, further comprising:
    analyzing records from golf simulations for each of the multiple identified golf club; and
    providing a recommendation of a golf club to the golfer based on the analysis.

14. The golf simulation method according to claim 11, further comprising:
    extracting record information about the golfer participating in a golf round;
    classifying the golfer based on the extracted record information according to golf skill of the golfer using a predetermined skill classification condition; and
    analyzing club selection of the classified golfer and displaying an analysis result.

* * * * *